United States Patent Office 2,867,565
Patented Jan. 6, 1959

2,867,565

SULFONAMIDE COMPOSITION COMPRISING A LIPID-AQUEOUS EMULSION CARRIER

Wolffe Harry Feinstone, Indianapolis, Ind.

No Drawing. Application August 12, 1957
Serial No. 677,769

3 Claims. (Cl. 167—51.5)

This invention relates to the enhancement of the therapeutic value of drugs administered orally. It has particular, though not exclusive, application to the absorbable sulfonamides. This application is a continuation-in-part of my application Serial No. 442,437, filed July 9, 1954, now abandoned.

It has been common practice heretofore orally to administer absorbable sulfonamides, such, for example, as sulfadiazine, sulfamerazine, sulfamethazine, mixtures of two or more of these sulfonamides, sulfacetamide, sulfamethylthiadiazole and sulfisoxazole, either as tablets, or as aqueous suspensions.

Feinstone and Williams (Journal of Bacteriology, volume 39, page 47, January 1940) suggested that the absorption of acyl derivatives of sulfanilamide was enhanced by administering them in a suspension of olive oil. However, Climenko, in Patent No. 2,238,973, reported that the absorption of acyl derivatives of sulfanilamide was at most only "slightly accelerated" by administering them in olive oil. Climenko indicates that in order to produce a therapeutic effect which is appreciably better than that obtainable with the use of a water suspension, an oil to drug ratio of at least twenty to one, and preferably forty to one, must be used with suspensions of sulfonamides in oil. This is shown graphically in Figure 1 of Climenko, in which a two to one oil to drug ratio gave results only slightly better than a water suspension of drug, while a ten to one oil to drug ratio gave results less satisfactory than the water suspension of the drug.

I have discovered that, contrary to the suggestion of Climenko, when absorbable sulfonamides are administered in an emulsion of edible fat and water, as distinguished from unemulsified fat, in which the oil to drug ratio is less than twenty to one and preferably in the range between twelve to one and one to one, not only is the therapeutic activity of the drug enhanced as compared with its activity in aqueous suspension (or in unemulsified oil, cf. Climenko, supra), but the absorption of the drug is markedly facilitated, the blood concentration for the same amount of the drug is almost doubled in human subjects, and an effective blood concentration of the drug is maintained for up to six times as long, as when equal amounts of the drug are administered in aqueous suspension.

These results are set out and discussed in an article in the Journal Lancet, 75: 437 (October 1955), describing the experimental work of Stevens and Henrickson, using triple sulfonamide and sulfadiazine ("Lipo-Triazine" and "Lipo-Diazine," respectively), supplied in the emulsion form of this invention by Donley-Evans and Co.

The following specific examples are illustrative of therapeutic compositions containing absorbable sulfonamides, made in accordance with this invention.

*Example I*

|  | Grams |
|---|---|
| Sulfamethazine | 3⅓ |
| Sulfadiazine | 3⅓ |
| Sulfamerazine | 3⅓ |
| Lipid-aqueous emulsion in sufficient quantity to make 100 cc. | |

The lipid-aqueous emulsion is a standard emulsion of edible fat and water, and may be made up as follows, the percentages being by weight:

|  | Percent |
|---|---|
| Coconut oil | 50.00 |
| Sucrose | 10.00 |
| Glyceryl monostearate (stabilizer) | 3.00 |
| Polyoxyethylene sorbitan monostearate (non-ionic emulsifier) | 3.00 |
| Sodium benzoate (preservative) | .01 |
| Butylated hydroxyanisole (anti-oxidant) | .005 |
| Flavoring materials | Ad. lib. |
| Coloring materials | Ad. lib. |
| Water, q. s. ad., 100%. | |

The recommended therapeutic dosage schedule is as follows:

Children, initially, 1 teaspoonful per ten lbs. of body weight, followed by one-half the initial dose every twelve hours;

Adults, initially, 2 to 3 tablespoonfuls, followed by one-half the initial dose every twelve hours.

*Example II*

|  | Grams |
|---|---|
| Sulfadiazine | 10 |
| Lipid-aqueous emulsion in sufficient quantity to make 100 cc. | |

As in Example I, the emulsion is standard. It may, for example, have the following composition, in percentages by weight:

|  | Percent |
|---|---|
| Corn oil | 40.00 |
| Dextrose | 10.00 |
| Purified soybean phosphatide | 3.00 |
| Polyoxyethylene sorbitan monostearate | 3.00 |
| Alkyl hydroxybenzoate | 0.01 |
| Sodium ethylene diamine tetraacetate | 0.05 |
| Flavoring materials | Ad. lib. |
| Coloring materials | Ad. lib. |
| Water in sufficient quantity to make 100%. | |

The dosage schedule is the same as for the composition of Example I.

*Example III*

|  | Grams |
|---|---|
| Sulfisoxazole | 20 |
| Lipid-aqueous emulsion in sufficient quantity to make 100 cc. | |

The lipid-aqueous emulsion is standard, and may be constituted as follows, in percentages by weight:

|  | Percent |
|---|---|
| Cotton seed oil | 60.00 |
| Lactose | 14.00 |
| Glycerol monostearate | 3.00 |
| Polyoxyethylene sorbitan monostearate | 3.00 |
| Sodium benzoate | 0.02 |
| Butylated hydroxyanisol | .005 |
| Flavoring materials | Ad. lib. |
| Coloring materials | Ad. lib. |
| Water in sufficient quantity to make 100%. | |

The dosage may be as follows:

Children, initial dose, one teaspoonful per each 20 pounds of weight, subsequent dosage, one-half teaspoonful per each 20 pounds of weight every twelve hours;

Adults, initially, two tablespoonfuls, subsequent dosage, three teaspoonfuls every twelve hours. For severe infections, the same dosages may be given every six to eight hours.

Any of the variuos absorbable sulfonamides or acetylated sulfonamides may be substituted for the sulfonamides set forth in the foregoing examples. The non-absorbable sulfonamides, such as sulfaguanadine, phthalylsulfacetamide, phthalylsulfathiazole and succinylsulfathiazole, which are employed chiefly for their anti-bacterial action against organisms inhabiting the intestinal canal, are not suitable to administration in oral lipid emulsions, since their absorpiotn into the blood stream is not desirable.

As has been pointed out in the examples themselves, the oil-water emulsion is a standard one, prepared by the usual procedures, such as those set out in the U. S. Dispensatory. It is, however, absolutely essential that the lipid constituent be what is commonly designated edible, digestible or absorbable fat, derived from animal or vegetable sources. Examples of such fats, in addition to the ones set out in the examples above, include peanut oil, butter fat, pecan oil, beef fat, lard and mutton fat. This list is merely illustrative. The fat should constitute 20% to 60% of the emulsion, by weight.

While the ratio of oil to drug in the examples given, ranges from approximately five to one to approximately three to one, the preferred range extends from about twelve to one to about one to one, this being the present normal dosage range. Thus sulfadiazine, sulfamerazine and sulfamethazine, either singly or in combination, are normally prepared in dosages of 0.5 gram per 5.0 cc. of suspension; sulfisoxazole is presently being prepared in dosages of 1.0 gram per 5.0 cc. of suspension, and sulfamethylthiadiazole is preesntly being prepared in dosages of 0.25 gram per 5.0 cc.

Having thus described the invention, what is claimed and desired to be secured by Letters Patent is:

1. A therapeutic composition for oral administration comprising an absorbable sulfonamide and a lipid-aqueous emulsion containing 20% to 60% by weight of an edible fat, the concentration of the sulfonamide being 0.5 gram per 5 cc. of said composition.

2. A therapeutic composition for oral administration comprising sulfadiazine and a lipid-aqueous emulsion containing 20% to 60% by weight of an edible fat, the concentration of the sulfadiazine being 0.5 gram per 5 cc. of said composition.

3. A therapeutic composition for oral administration comprising absorbable sulfonamide and a lipid-aqueous emulsion containing 20% to 60% by weight of an edible fat, the oil to drug ratio of the composition being between about one to one and about twelve to one.

References Cited in the file of this patent

UNITED STATES PATENTS

| | | |
|---|---|---|
| 2,055,083 | Klein | Sept. 22, 1936 |
| 2,348,973 | Climenko | Apr. 22, 1941 |
| 2,608,508 | Sprague | Aug. 26, 1952 |

OTHER REFERENCES

Goldberg et al.: J. A. M. A., vol. 150, No. 17, pp. 1665–1667, December 27, 1952.

J. Bacteriology, vol. 39, Jan.-June 1940, pp. 47–48.